(12) United States Patent  (10) Patent No.: US 7,550,954 B2
De Nisi et al.  (45) Date of Patent: Jun. 23, 2009

(54) METHOD AND CIRCUIT FOR A VOLTAGE SUPPLY FOR REAL TIME CLOCK CIRCUITRY BASED ON VOLTAGE REGULATED CHARGE PUMP

(75) Inventors: Fabrizio De Nisi, Sant'Olcese (IT); Gian Marco Bo, Savona (IT)

(73) Assignee: Atmel Corporation, San Jose, CA (US)

( * ) Notice: Subject to any disclaimer, the term of this patent is extended or adjusted under 35 U.S.C. 154(b) by 74 days.

(21) Appl. No.: 11/464,604

(22) Filed: Aug. 15, 2006

(65) Prior Publication Data
US 2007/0252564 A1    Nov. 1, 2007

(30) Foreign Application Priority Data
Apr. 14, 2006  (IT) ........................... MI2006A0758

(51) Int. Cl.
G05F 1/575   (2006.01)
H02J 3/32    (2006.01)

(52) U.S. Cl. ..................... 323/266; 323/268; 307/45

(58) Field of Classification Search ............... 323/266, 323/268, 273, 274; 307/44, 45, 48, 64, 66; 327/536
See application file for complete search history.

(56) References Cited

U.S. PATENT DOCUMENTS

| 5,563,499 | A * | 10/1996 | Pinney | 323/266 |
|---|---|---|---|---|
| 5,682,050 | A * | 10/1997 | Williams | 257/368 |
| 5,694,308 | A | 12/1997 | Cave | |
| 6,262,567 | B1 * | 7/2001 | Bartlett | 323/303 |
| 6,300,820 | B1 | 10/2001 | Fotouhi et al. | |
| 6,304,467 | B1 | 10/2001 | Nebrigic | |
| 6,370,075 | B1 | 4/2002 | Haeberli et al. | |
| 6,456,153 | B2 | 9/2002 | Buck et al. | |
| 6,504,422 | B1 | 1/2003 | Rader et al. | |
| 6,597,158 | B2 * | 7/2003 | Umeda | 323/268 |
| 6,617,832 | B1 * | 9/2003 | Kobayashi | 323/266 |
| 6,873,203 | B1 | 3/2005 | Latham, II et al. | |
| 7,091,701 | B2 * | 8/2006 | Turner et al. | 320/166 |
| 2005/0189983 | A1 | 9/2005 | Sivero et al. | |
| 2006/0082351 | A1 * | 4/2006 | Martins et al. | 323/268 |
| 2006/0181340 | A1 * | 8/2006 | Dhuyvetter | 330/6 |

* cited by examiner

Primary Examiner—Gary L Laxton
(74) Attorney, Agent, or Firm—Schwegman, Lundberg & Woessner, P.A.

(57) ABSTRACT

A versatile voltage regulator accommodates either an Alkaline or Lithium-Ion battery main battery and provides low-current power for a real time clock module and for charging a backup battery. Depending upon the battery power source that is used, the present invention provides a best circuit configuration for efficient power conversion. If the power converter according to the present invention provides a regulated output voltage that is greater than the main battery voltage of an Alkaline battery, a low drop-out-voltage (LDO) voltage regulator is used in feedback loop with a charge pump. Otherwise, for a Lithium-Ion battery, only a LDO voltage regulator is used. The voltage regulator includes a series low drop-out-voltage (LDO) voltage regulator that is coupled between the main external battery and the vout load terminal, when the voltage at the vout load terminal is less than the voltage of the main external battery. The voltage regulator also includes a charge pump circuit adapted to be connected in feedback loop with the LDO regulator and the vout load terminal, when the voltage at the vout load terminal exceeds the voltage of the main external battery.

33 Claims, 3 Drawing Sheets

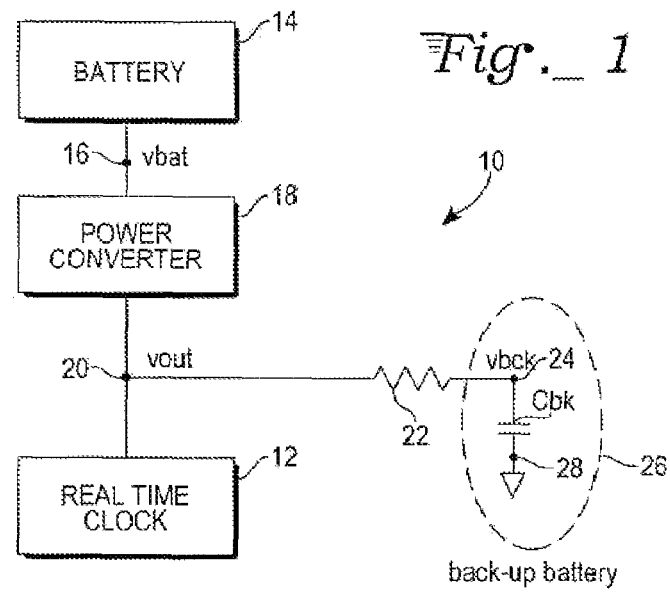
Fig._1
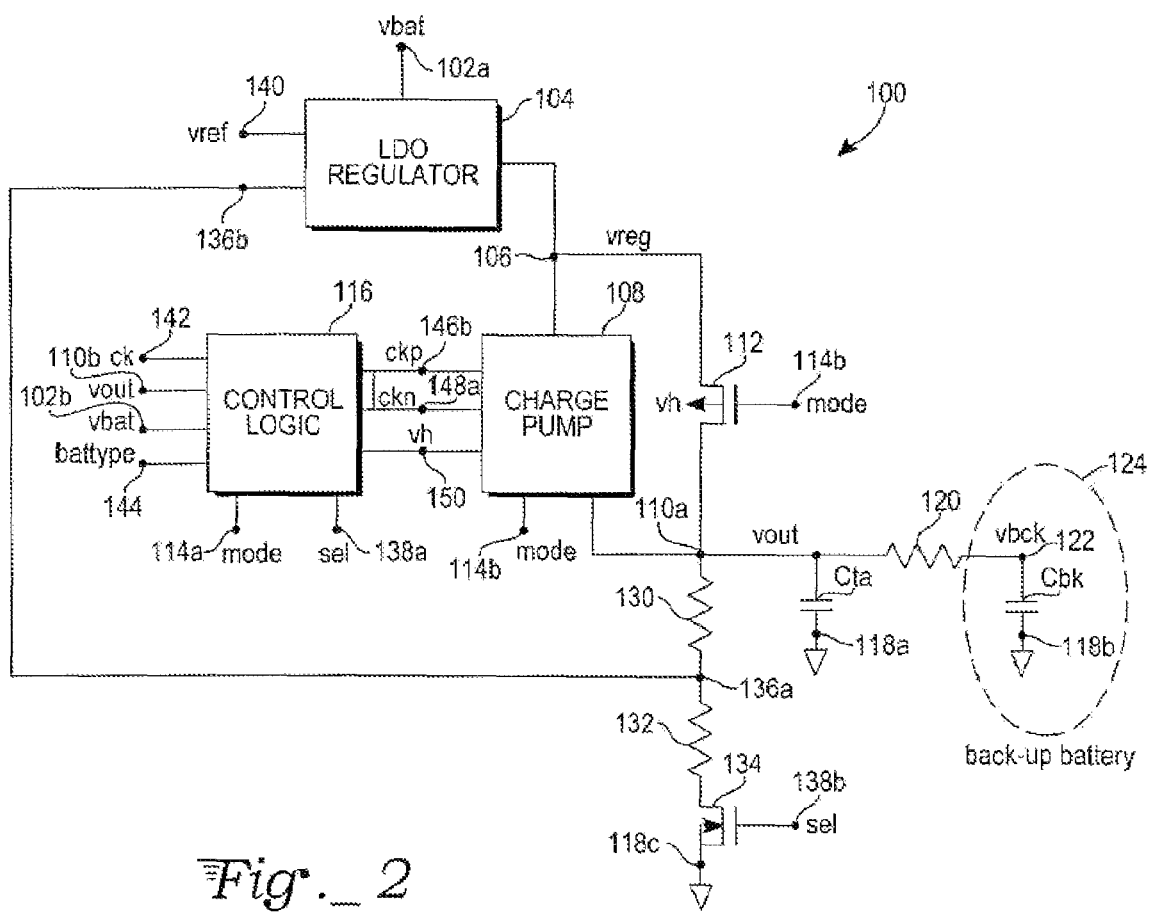
Fig._2

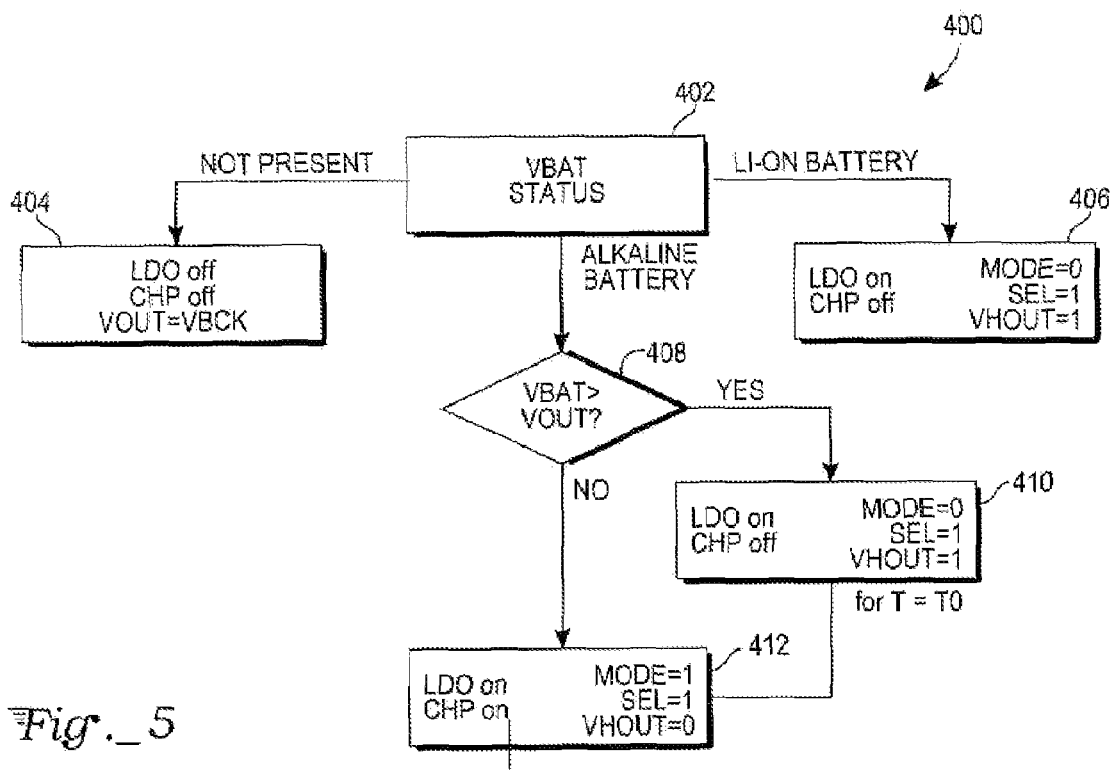
Fig. 5
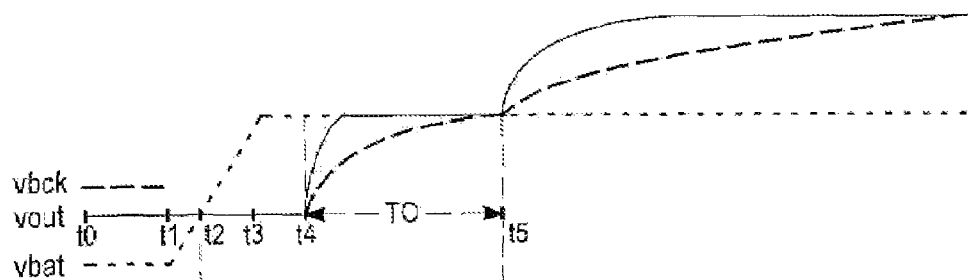
Fig. 6A
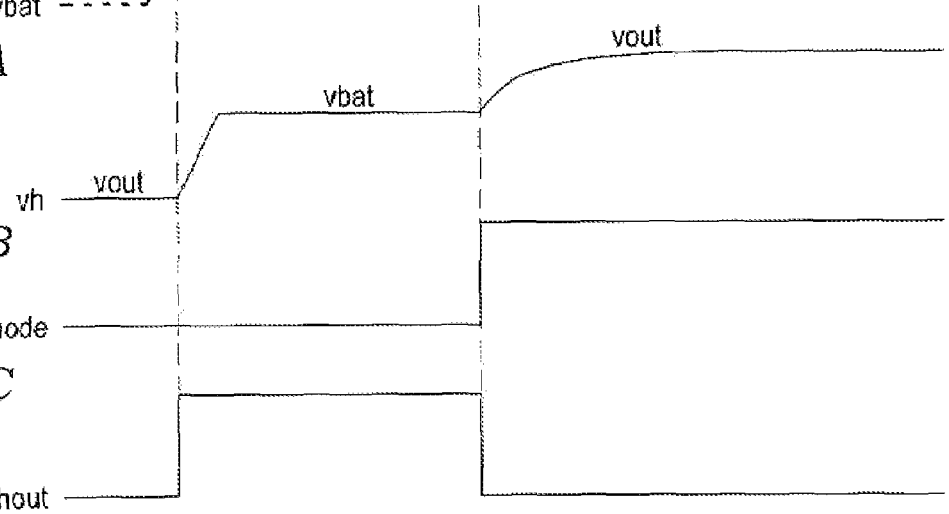
Fig. 6B
Fig. 6C
Fig. 6D

METHOD AND CIRCUIT FOR A VOLTAGE SUPPLY FOR REAL TIME CLOCK CIRCUITRY BASED ON VOLTAGE REGULATED CHARGE PUMP

TECHNICAL FIELD

The present invention relates to voltage regulators for battery-powered systems and, in particular, to an adaptable power converter that works with various types of main batteries.

BACKGROUND

A CMOS Power Management (PM) Integrated Circuit (IC) is used in a number of applications, including, for example, battery power supplies for handheld electronic devices such as WLAN portable devices, multimedia devices, and portable music players. Battery power for operating these handheld electronic devices is often supplied by a low voltage battery, such as, for example, a two-cell Alkaline battery that provides a terminal voltage over a voltage range of 1.8 to 3 volts. Battery power for these handheld electronic devices is also sometimes supplied by a battery with a higher voltage, such as a Lithium Ion battery that provides a terminal voltage over a voltage range of 3 to 4.2 volts.

A PM IC can include an auxiliary circuit block, such as a Real Time Clock (RTC) circuit that provides time and data information. An auxiliary circuit block of this type often needs to be operational even when the main batteries are not available in order to maintain, for example, time and data information in a RTC circuit. In this case, a back-up battery supplies the RTC circuit when the main battery cannot supply power to the PM. When the main supply battery of a voltage regulator for a low-current real time clock (RTC) circuit is removed, a 3 volt Lithium-Ion back-up battery ensures that the RTC circuit can operate for a relatively long time without a main supply battery.

However, problems can arise if the main supply battery is provided, for example, by a two-cell alkaline battery that has a voltage range of 1.8 to 3 volts. In this case, the two-cell alkaline main battery could not provide sufficient voltage by itself to directly supply the RTC circuit and also to charge a back-up battery, such as a 3.0 volt Lithium-ion. In this case, a power converter is needed that is able to generate a voltage that is higher than the voltage provided by the two-cell alkaline main battery and that charges the back-up battery.

Power management for a power converter that accommodates several different types of main supply batteries is not very efficient for use in conjunction with a low-current type of auxiliary RTC circuit in a PM IC. In a typical CMOS process with, for example, a 0.35 micron technology, a RTC block can be supplied by a 3 volt battery with a lower supply current that is in the range of 1 to 10 microamps. Using a higher voltage battery, such as Li-Ion battery, a low-current RTC circuit can be powered using only a low-power, LDO voltage regulator. On the other hand, using an Alkaline battery requires that the RTC circuit must be supplied with a higher voltage from a voltage step-up power converter that steps-up the Alkaline battery input voltage to a higher output voltage level. From a power efficiency point of view, a step-up power converter is inefficient. In fact, a step-up power converter, such as, for example, a regulated charge pump, uses digital and analog circuits that require currents of at least some tens of microamps. Consequently, there is a need for a power converter that has very low power consumption and that can also efficiently supply power from both low voltage Alkaline batteries and from higher voltage Lithium-ion batteries.

FIG. 1 is an example of a conventional regulator and charger configuration 10 for a low-current RTC circuit and a back-up battery. A main supply battery 14 provides at an output terminal 16 an output voltage vbat to a power converter 18. The power converter 18 provides a regulated output voltage vout at the output terminal 20 to power the RTC circuit 12. The output terminal 20 of the power converter 18 is connected through a series resistor 22 (used to limit the back-up battery charge current) to a back-up battery terminal 24 at which is provided a voltage vbck for charging a back-up battery 26. The back-up battery 26 is represented as a capacitor Cbk that is connected between the back-up battery terminal 24 and a ground terminal 28. A typical back-up battery provides a voltage of 3 volts.

Prior art for a regulated power supply based on a charge pump is disclosed in U.S. Pat. Nos. 5,694,308; 6,300,820; 6,456,153; and 6,873,203. These charge pump patents have two common characteristics: 1) for good power efficiency, the regulated output voltages must be greater than the main power supply voltage; and 2) the circuits shown in these patents are not optimized to efficiently supply a low-power block, such as RTC circuit.

SUMMARY OF THE INVENTION

The present invention provides a method and a circuitry for providing a supply voltage for a low-current real time clock circuit from a main battery that includes either a single Lithium battery or Alkaline cell batteries. The present invention also provides a charger circuit for a 3 volt back-up battery. The present invention is useful for a RTC circuit voltage supply and for charging a back-up battery for any type of portable device, such as a mobile telephone, a palmtop computer, a digital camera, etc.

Depending upon the battery power source that is used, the present invention provides a best circuit configuration for efficient power conversion. If the main battery voltage is lower than the power converter output voltage, as it occurs when Alkaline batteries are used, a low-drop-out (LDO) voltage regulator with a charge pump in the feedback loop is used. Otherwise (for a Lithium-Ion battery) only the LDO is used.

The present invention provides a voltage regulator for power provided from a main external battery having a vbat voltage. A regulated voltage is delivered to a vout load terminal for an external load. The voltage regulator includes a series low drop-out-voltage (LDO) voltage regulator that is coupled between the main external battery and the vout load terminal, when the voltage at the vout load terminal is less than the voltage of the main external battery. The voltage regulator also includes a charge pump circuit adapted to be connected in feedback loop with the LDO regulator and the vout load terminal, when the voltage at the vout load terminal exceeds the voltage of the main external battery.

One embodiment of the LDO regulator includes an input terminal coupled to the main external batteries, a vreg output terminal, a reference voltage terminal adapted to be coupled to a voltage reference, and a feedback signal terminal for receiving a scaled vout signal. The charge pump circuit includes an input terminal coupled to the output terminal of the LDO voltage regulator and also includes an output terminal coupled to the vout output terminal. A switch device directly connects said the input and output terminals of the charge pump circuit, when the charge pump is inactive. The voltage regulator includes a voltage divider circuit connected to the vout output terminal and a scaled presentation of the output voltage signal to the feedback signal terminal of the LDO voltage regulator circuit. A back-up battery is coupled to the vout terminal to be charged by the voltage regulator circuit and to provide a backup voltage to the vout terminal.

The present invention provides a voltage regulator circuit that includes a vbat input terminal adapted to be connected to an external main supply battery and a vout output terminal adapted to be connected to a load circuit for the power converter and also adapted to be coupled to a back-up battery. A low-drop-out-voltage LDO voltage regulator circuit is provided and has: an input terminal coupled to the vbat input terminal, a vreg output terminal, a reference voltage terminal adapted to be coupled to a voltage reference, and a feedback signal terminal. A charge pump has an input terminal coupled to said output terminal of the low drop out LDO voltage regulator and has an output terminal coupled to the vout output terminal. A switch device is provided for directly connecting the input and output terminals of said charge pump circuit when the charge pump is not used. A voltage divider circuit is connected to the vout output terminal and provides a scaled representation of the output reference voltage signal to the feedback signal terminal of LDO voltage regulator circuit. A back-up battery is coupled to the vout terminal to be charged by the voltage regulator circuit and to provide a backup voltage to the vout terminal. A tank capacitor is connected to the vout output terminal.

Means are provided for activating the charge pump circuit when the voltage at the vbat input terminal is lower than the voltage at the vout output terminal. Means are provided for deactivating the charge pump circuit and for operating the switch device to directly connect the input and output terminals of the charge pump circuit when the voltage at the vout output terminal is less than the voltage at the vbat terminal.

The switch device includes a MOS switch transistor.

The LDO voltage regulator circuit includes an error amplifier having respective input terminals connected to the reference voltage terminal and to the feedback signal terminal. The error amplifier has an output terminal connected to a gate terminal of a MOS pass transistor having terminals connected respectively to the vbat terminal and to the vreg terminal. The charge pump circuit includes: a charge pump control circuit having an output terminal connected to one terminal of a fly capacitor, the other end of the fly capacitor connected to a charging node, a first MOS transistor connected between the input terminal of the charge pump circuit and the charging node, a second MOS transistor connected to between the charging node and the vout output terminal, clock circuit providing clock signals to gate terminals of the first and second MOS transistors.

One embodiment of the back-up battery is a 3.0 volt Lithium-Ion battery. The vbat input terminal is adapted to be connected to an external main supply battery that is Lithium-Ion battery having a terminal voltage ranging between 3 to 4.2 volts. Only the LDO voltage regulator circuit is activated for such a Lithium-Ion battery. The vbat input terminal is also adapted to be connected to an external main supply battery that is an Alkaline battery having a terminal voltage ranging between 1.8 to 3 volts. Both the low drop out LDO voltage regulator circuit and the charge pump circuit in feedback loop are activated for such an Alkaline battery.

The charge pump circuit is adapted to be activated with the Alkaline battery when the voltage at the vout output terminal exceeds the voltage at the vbat input terminal.

The load circuit includes a low-current real time clock circuit that is powered by the power converter from the external main supply voltage or from the back-up battery in case of the external main supply battery not being available.

The present invention provides a method of providing a regulated vout voltage to a load circuit from a main external battery having a vbat voltage. The method includes the steps of: regulating the voltage from the external main supply battery in a series low drop out voltage LDO voltage regulator; alternatively connecting a charge pump circuit in the feedback loop with the LDO regulator, when the external main battery has a terminal voltage less than the output voltage; and connecting a back-up battery to the vout terminal to supply a backup voltage to the load circuit when the vbat voltage from the main battery is absent.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of a conventional power supply regulator for a RTC block and for charging a back-up battery.

FIG. 2 is a block diagram of an embodiment of a versatile voltage regulator circuit that powers a real-time clock circuit and that charges a back-up battery for the real time clock circuit.

FIG. 5 is a flow diagram illustrating basic operation of the versatile voltage regulator of FIG. 2 for operation with no external battery, with an Alkaline battery, and with a Lithium-Ion battery.

FIGS. 6A-6D are signal diagrams showing various signals for a power-on sequence for a voltage regulator supplied by an external Alkaline battery, where the voltage of the external battery source value is greater than the output voltage of the voltage regulator.

DETAILED DESCRIPTION

Figure 3:
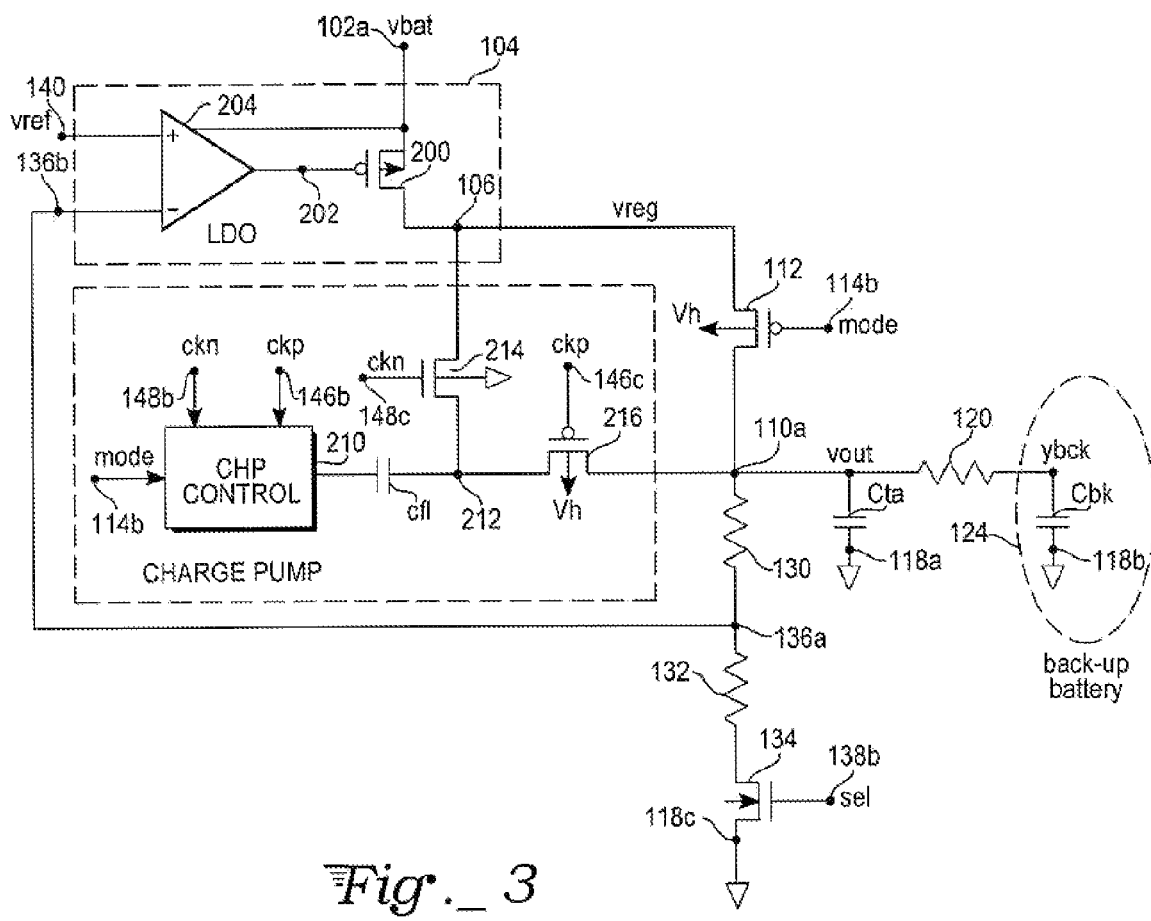
FIG. 3 is a more detailed circuit diagram for the versatile voltage regulator of FIG. 2 showing circuit details of a low drop-out voltage regulator circuit and for a charge pump circuit.

The present invention provides a versatile LDO voltage regulator that includes a very small charge pump in order to provide a regulated voltage output (3v.) for low current loads. The charge pump is inserted in the regulation loop without additional regulation circuitry in order to decrease the total power consumption and improving the power efficiency performance respect of using a simple regulated charge pump.

FIG. 2 is a block diagram of one embodiment of a versatile voltage regulator 100 that efficiently provides a regulated voltage supply for a low power circuit, such as, for example, a low-power real time clock circuit illustrated in FIG. 1. An external main supply battery, not shown, provides a voltage vbat at a vbat input terminal 102a of a low voltage drop (LDO) regulator 104. A LDO voltage regulator typically provides a well-regulated output voltage while providing a relatively low voltage drop between its input and output terminals at the point where the LDO voltage regulator stops regulating. The LDO voltage regulator 104 provides a regulated output voltage vreg at a vreg output terminal 106.

FIG. 2 illustrates that the vreg output terminal 106 of the LDO voltage regulator 104 is connected to an input terminal of a charge pump circuit 108. The charge pump circuit 108 is, for example, a voltage doubler circuit that provides an output voltage at a vout output terminal 110a. Connected in parallel with the charge pump circuit 108 between the vreg terminal 106 and the vout terminal 110a is a parallel switch device, such as, for example, a PMOS transistor switch 112. The PMOS switch transistor 112 has a source terminal connected to the vreg output terminal 106 of the LDO regulator 104. The PMOS switch transistor 112 also has a drain terminal connected to the vout output terminal 110a. The PMOS switch transistor 112 is controlled by a mode signal that is provided to a gate terminal 114b of the PMOS switch transistor 112 from a mode terminal 114a of a control logic block circuit 116. A LOW voltage at the gate terminal 114b turns on the PMOS switch transmitter 112; and a HIGH voltage at the gate terminal 114b turns off the PMOS switch transistor 112. A tank capacitor Cta for the charge pump circuit 108 is connected between the vout output terminal 110a and a ground terminal 118a.

The vout output terminal 110a is connected through a series resistor 120 to a back-up battery terminal 122 for a back-up battery 124 having a terminal voltage vbck. The vout voltage can charge the back-up battery through the series resistor 120. Such resistor is used to limit the current source to charge the back-up battery. The back-up battery 124 is represented as a capacitor Cbk that is connected between the back-up battery terminal 122 and the ground terminal 118b. The back-up battery 124 for low-current applications is typically a button Lithium-Ion battery having a nominal terminal voltage of 3.0 volts.

The vout output terminal 110a is connected to a series voltage divider circuit comprising a first series resistor 130, a second series resistor 132, and a series NMOS switch transistor 134 that is connected to a ground terminal 118c. One end of the first series resistor 130 is connected to the vout terminal 110a. The other end of the first series resistor 130 is connected to a feedback node 136a and to one end of the second series resistor 132. The other end of the second series resistor 132 is connected to a drain terminal of the series NMOS switch transistor 134. A source terminal of the series NMOS switch transistor 134 is connected to the ground terminal 118c. The series NMOS switch transistor 134 is controlled by a sel signal that is provided to a gate terminal 138b of the series NMOS switch transistor 134 from a sel terminal 138a of the control logic block circuit 116. The feedback node 136a is connected to a feedback input terminal 136b of the LDO regulator 104. A vref input terminal 140 of the LDO regulator 104 receives a 1.2 volt reference voltage for the LDO regulator 104.

The control logic block circuit 115 has a number of input terminals. A ck terminal 142 receives an external clock signal from a clock reference source. A vout terminal 110b receives the vout signal from vout terminal 110a. A vbat terminal 102b is connected to the vbat terminal 102a. A battype terminal 144 is set to a logic LOW level to indicate that two external alkaline battery cells are used to provide vbat, which ranges from 1.8 to 3 volts. Alternatively, the voltage at the battype terminal 144 is set to a logic HIGH level to indicate that one external Lithium-ion battery cell is used to provide vbat, which ranges from 3 to 4.2 volts.

The control logic block circuit 116 also has a number of output terminals. A ckp terminal 146a provides a clock phase signal ckp to a voltage doubler circuit of the charge pump circuit 108. A ckn terminal 148a provides a clock phase signal ckn to the voltage doubler circuit of the charge pump circuit 108. Ckp and ckn are two non-overlapping clock phases. A vh terminal 150 provides vh voltage signal to the charge pump circuit 108.

FIG. 3 illustrates circuit details of the LDO voltage regulator 104 and of the charge pump 108 of FIG. 2. The LDO voltage regulator includes a PMOS series regulator transistor 200 that has a drain terminal connected to the vbat input terminal 102a and a source terminal connected to the vreg terminal 106. A gate terminal of the PMOS series regulator transistor 200 is connected to an output terminal 202 of an error amplifier 204. A non-inverting input terminal of the op amp 204 is connected to the vref input terminal 140 to receive the 1.2 volt reference voltage. An inverting input terminal of the op amp 204 is connected to the feedback input terminal 136b of the LDO regulator 104. The error amplifier compares a scaled down vout voltage to the vref voltage and provides a error signal to the gate terminal of the PMOS series regulator transistor 200 to hold vout at a constant voltage level.

The charge pump circuit 108 includes a charge pump CHP control circuit 210 that receives a mode signal at terminal 114b from the control logic circuit 116. The CHP control circuit 210 receives from the control logic circuit 116 a clock phase signal ckp at the ckp terminal 146b and a clock phase signal ckn at the ckn terminal 148b. The charge pump circuit 108 also includes a fly capacitor Cfl that has one terminal connected to an output terminal of the CHP control circuit 210 and that has another terminal connected to a pumping node 212. An NMOS charge pump transistor 214 has a drain terminal connected to the vreg terminal 106 and a source terminal connected to the pumping node 212. A gate terminal of the NMOS charge pump transistor 214 is connected to a ckn terminal 148c. A PMOS charge pump transistor 216 has source terminal connected to the pumping node 212 and a drain terminal connected to the vout terminal 110a. A gate terminal of the PMOS charge pump transistor 216 is connected to a ckp terminal 146c.

Figure 4:
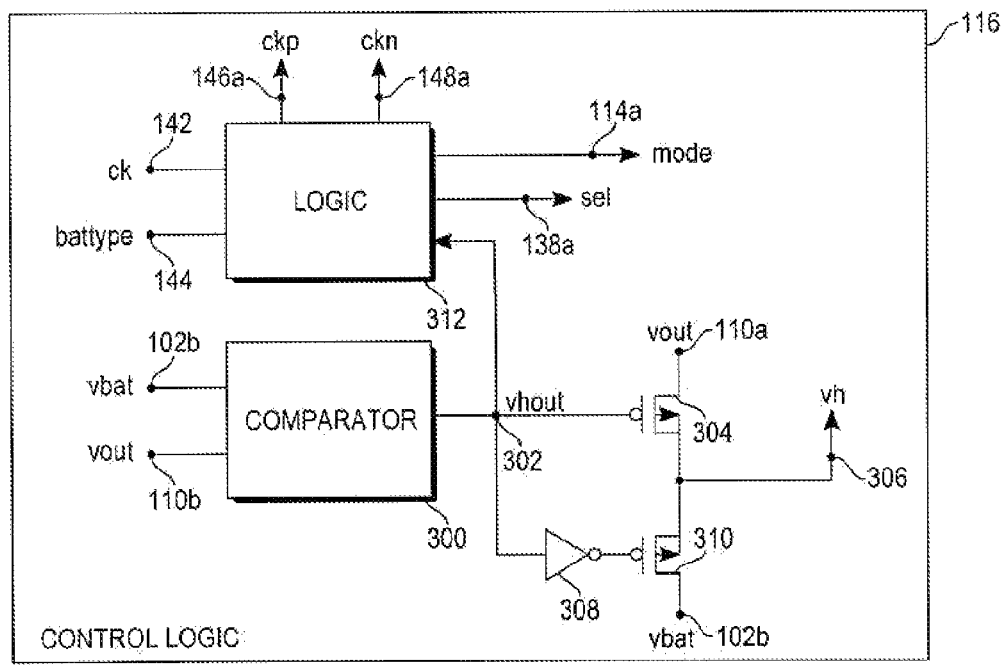
FIG. 4 is a block diagram for a control circuit used in the versatile voltage regulator of FIG. 2.

FIG. 4 is a more detailed block diagram of the control logic block circuit 116 of FIG. 2. A comparator 300 compares vout with vbat and provides a vhout signal at a vhout terminal 302. The vhout terminal is connected to a gate terminal of a first PMOS transistor 304 that has a source terminal connected to a vout terminal 110a and a drain terminal connected to a vh output terminal 306. The vhout terminal is also connected through an inverter 308 to a gate terminal of a second PMOS transistor 310 that has a source terminal connected to a vbat terminal 102b and a drain terminal connected to the vh output terminal 306. If the vbat voltage is greater than the vout voltage, vhout is HIGH, which turns off the first PMOS transistor 304 and which turns on the second PMOS transistor 310 to provide the vbat voltage at the vh terminal 306. If the vbat voltage is less than the vout voltage, vhout is LOW which turns on the first PMOS transistor 304 and which turns off the second PMOS transistor 310 to provide the vout voltage at the vh terminal 306. The vhout signal is used to determine the vh voltage at the terminal 306, where vh=max[vout, vbat]. The vh voltage is applied to the bulks of the PMOS transistors 112, 216 in FIGS. 2 and 3 to correctly polarize the bulk of those PMOS transistors. This circuit operates even when the Vbat signal is not present.

The vhout signal at terminal 302 is also fed to a logic circuit 312 where it is logically combined with the battype signal provided at terminal 144. The battype terminal 144 is hardwired to a logic LOW level to indicate that two external Alkaline battery cells are used to provide vbat, which ranges from 1.8 to 3 volts. Alternatively, the battype terminal 144 is set to a logic HIGH level to indicate that vbat is provided by one external Lithium-ion battery cell, where vbat ranges from 3 to 4.2 volts. The logic circuit 312 also uses logic gates to determine the state of the mode signal at terminal 114a and the state of the sel signal at terminal 138a. A LOW mode signal turns on the PMOS switch transistor 112 to connect the vreg terminal 106 to the vout terminal 110a when the charge pump circuit 108 is not activated. A HIGH mode signal turns off the PMOS switch transistor 112. A HIGH sel signal turns on the series NMOS switch transistor 134 to ground the series voltage divider 130, 132 so that the feedback node 136a provides an error signal to the error amplifier 204 of the LDO voltage regulator 104.

The clock signal received at terminal 142 is used to generate the two non-overlapping clock phases ckp at terminal 146a and ckn at terminal 148a to operate the charge pump 108.

In a Lithium-ion battery configuration, the voltage regulator circuit 100 is powered with a Lithium-ion battery connected to the vbat input terminal 102a. The vbat voltage for a Lithium-ion battery ranges between 3 and 4.2 volts. The control logic circuit 116 of FIG. 4 provides a LOW mode signal on terminal 114b that turns on the PMOS transistor switch 112. The control logic circuit 116 of FIG. 4 also provides the sel signal on terminal 138b that turns on the NMOS transistor 134. The charge pump circuit 108 is disabled through the mode signal at terminal 114b and has its output in a high impedance state. In this state, the voltage regulator circuit 100 is configured as a normal LDO voltage regulator circuit, where vreg is equal to vout. This configuration uses the voltage divider circuit provided by the first series resistor 130 and the second series resistor 132 to provide a feedback signal to the inverting input terminal of the op amp 204, which drives the PMOS series regulator transistor 200. The 1.2 volt vref signal at terminal 140 is compared with a scaled value of the vout at node 136b to provide an error signal to drive the PMOS series regulator transistor 200 to re-adjust the vout voltage. This type of voltage regulator is designed to have a very low supply current, less than 5 microamps. Any variations in the vout output voltage at terminal 110a due to supply variations, load variations, temperature variations, etc., are fed back to the feedback input terminal 136b of the LDO regulator 104 that perform the compensation to maintain a constant vout voltage level.

In an Alkaline battery configuration, the voltage LDO is powered with an Alkaline battery, the switch device provided by the PMOS switch transistor 112 is open and the charge pump circuit 108 is active. In this state, the LDO voltage regulator and the charge pump circuit 108 are connected in series within a feedback circuit. The voltage regulator circuit 100 is configured to have the output of the LDO 104 to power a voltage doubler circuit in the charge pump circuit 108 that to provides a 3 volt vout voltage level at the output terminal 110a.

Any variation in the vout output voltage at terminal 110a due to load, temperature, etc, variations are fed back to the feedback input terminal 136b of the LDO regulator 104 to adjust its regulated output voltage vreg at the input terminal to the charge pump circuit 108 to maintain a constant vout voltage level out of the charge pump circuit 108.

Operation of Regulated the Charge Pump

The charge pump circuit 108 is enabled by the control logic block 116. The PMOS transistor switch 112 is switched off by the mode signal. The charge pump is a voltage doubler circuit that includes the NMOS charge pump transistor 214, the PMOS charge pump transistor 216, the fly capacitor Cfl, the tank capacitor Cta, and the charge pump (CHP) control circuit 210. The charge pump (CHP) control circuit 210 enables and disables the charge pump and also drives the fly capacitor Cfl. The NMOS charge pump transistor 214 and the PMOS charge pump transistor 216 are respectively driven by the non-overlapping clock signals ckn and ckp.

The charge pump circuit works in two phases. In the first phase, the NMOS charge pump transistor 214 is turned on and the PMOS charge pump transistor 216 is turned off. In the first phase, one terminal of the fly capacitor Cfl is connected to ground at the output terminal of the CHP control circuit 210 and the other terminal at the pumping node 212 is connected to the vreg terminal 106 through the NMOS charge pump transistor 214. In the first phase, the PMOS charge pump transistor 216 electrically disconnects the tank capacitor Cta from the pumping node and the fly capacitor Cfl. The tank capacitor Cta provides storage for the output voltage Vout to a load.

In the second phase, the NMOS charge pump transistor 214 is turned off and the PMOS charge pump transistor 216 is turned on. In the second state, one terminal of the fly capacitor Cfl is electrically connected in series with the tank capacitor Cta while the other terminal of Cfl is driven to vreg through the CHP control circuit 210 so that the vout output terminal 110a is charged to approximately twice the input voltage vreg.

As previously discussed, a fraction of the charge pump output voltage is fed to an input terminal of the error amplifier 204, which compares this fractional voltage with the voltage reference vref. The voltage vreg is then automatically adjusted to provide an input voltage to the charge pump to maintain a given output voltage at the vout terminal 110a. Use of the voltage doubling capability of the charge pump allows the vout voltage to be at level that is higher than the vbat battery voltage.

The regulated charge pump is part of a feedback voltage regulator configuration, so that no additional circuits are needed to provide voltage regulation. As a result, power consumption and the dimensions of the voltage regulator can be decreased.

Because the RTC power supply requires about 10 microamps, the current load for the CHP is low enough to permit the use of a small 10 picofarad integrated fly capacitor value. For the tank capacitor Cta, an external capacitor of 30 nanofarads is used.

The voltage regulator circuit according to the present invention can supply an RTC circuit and also a charger for a 3.0 volt back-up battery. The inclusion of a back-up battery and the capability of charging the back-up battery presents various situations upon the powering-on of the voltage regulator circuit.

Power On Situations

Management of power-on situations is controlled by the control logic block circuit of FIG. 4. The voltage comparator 300 compares vout with vbat. The resultant comparator output signal vhout is used to select a value of the voltage vh that is used to correctly polarize the bulk of the PMOS transistors, where vh=max[vout, vbat]. Operation of this circuit is used also when vbat is not present because vh voltage is always necessary to correctly polarize PMOS bulks. The vhout voltage is also used by the logic block 312 along with the battype signal. The battype signal is hardwired to either a 1 or a 0 state, according to the battery type used. The logic block 312 uses different logic gates to determine the mode signal and the sel signal to manage the power-on phase. Moreover, the logic circuit 312 also receives the clock signal ck and it generates the two non-overlapping phases ckp, ckn for controlling the charge pump.

FIG. 5 is a flow chart 400 that summarizes operation of the voltage regulator circuit 100 of FIG. 2 for three cases relating to the type of external battery connected to the vbat terminal 102a. In block 402, the type and presence of an external battery is determined for the three cases, including no external battery being present, a Lithium-Ion battery being used, and an Alkaline battery being used.

Vbat Not Present

In this case, vbat is not present, the LDO voltage regulator 104 is off, the CHP 108 is off, the RTC module is supplied by the back-up battery 124, and vout=vbck. In this situation, the NMOS switch transistor 134 is open to disconnect the resistive ladder from the output voltage vout in order to save power.

Lithium-Ion Battery

When a Lithium-Ion battery with a vbat=3 to 4.2 volts is used, Block 406 indicates that the CHP 108 is off and that the LDO voltage regulator 104 is on or active to provide current to the RTC circuit and to charge the back-up battery to 3.0 volt. The mode signal is LOW and the sel signal is HIGH.

Alkaline Battery

An Alkaline battery has a vbat terminal voltage that ranges between 1.8 and 3.0 V, a decision Block 408 determines if vbat is greater than vout or not.

If vbat>vout, the LDO voltage regulator 104 is on and CHP is off. The mode signal is LOW so that the PMOS transistor switch 112 is turned on to provide a connection between the vreg terminal 106 and the vout terminal 110a. The sel signal is HIGH so that the series NMOS switch transistor 134 is turned on and a feedback signal is provided to the error amplifier 204. The LDO 104 provides current to quickly charge the back up battery nearly to vbat. The system remains in this state for a time T0. The value of T0 depends on the characteristics of the back-up battery and is pre-selected.

Block 412 indicates that after a time T0 or when Block 408 determines that vbat<vout, the CHP 108 is switched on, the CHP is activated, and the mode signal is HIGH to turn off the PMOS switch transistor 112. The series combination of the LDO 104 and the CHP 108 provides a regulated vout output voltage at terminal 110a. The back-up battery is slowly charged until it reaches 3 volts.

Continuous comparison of vout with vbat enables automatic switching between the two working modes described above, that is, between one state in which only LDO 104 is operating and the other state in which both LDO 104 in series with CHP 108 are operating together. Thus, until vbat>vout, the voltage regulator 100 works as a LDO voltage regulator. When vout reaches vbat, the voltage regulator 100 switches its configuration to become a regulated charge pump.

FIGS. 6A-6D show various signals as a function of time for a power-on sequence for a voltage regulator supplied by an external Alkaline battery. FIG. 6A illustrates voltages for vbat, vout, and vbck. FIG. 6B illustrates a corresponding vh voltage, which is the maximum between vbat and vout. FIG. 6C illustrates a corresponding mode signal voltage. FIG. 6D illustrates a corresponding vhout signal.

FIG. 6A illustrates vbat starting at a lowest voltage level at time t0 and at time t1 starting to linearly increase. At time t2 vbat starts to exceed vout and continues to linearly increase until it reaches a maximum voltage level at time t3 and remains at that voltage level. Starting at time t0 the back-up battery 124 provides the vout voltage and continues to provide the vout voltage until time t4 at which the LDO voltage regulator 104 starts to operate.

Starting at t4, the LDO voltage regulator 104 provide a relatively large current that rapidly increases the vout voltage until vout quickly reaches the vbat voltage level. After time t4, the LDO voltage regulator 104 provides a fast charge to the back-up battery 124 from time t4 to a time t5 for a period TO so that vbck increases at a fast rate.

At time t5, the CHP charge pump 108 starts operation and the mode voltage goes HIGH to turn off the PMOS transistor switch 112 and connect the LDO voltage regulator in series with the charge pump circuit 108. Less current is provided by this arrangement so that after time t5, vout continues to increase at a somewhat slower rate toward a final maximum value or vout. The vbck voltage for the back-up voltage also increases at a slower charging rate toward the vout voltage level. After time t5, the vhout voltage changes state. After time t5, the vh voltage also tracks the vout voltage.

It is apparent that the present invention provides a versatile voltage regulator that is adaptable to various types of batteries. The present invention includes a LDO voltage regulator that can be used for voltage regulation for a low-current load using a higher voltage Lithium-Ion battery. For a lower voltage Alkaline battery, the LDO voltage regulator is combined in series with very small charge pump in order to provide a regulated voltage output for a low-current loads. The charge pump is inserted in the LDO regulation loop without the need for additional circuitry in order to decrease total power consumption for voltage regulation and to improve the power efficiency of the voltage regulator.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A voltage regulator for power provided from a main external battery having a vbat voltage to a vout load terminal for an external load, comprising:
    a low drop-out-voltage (LDO) voltage regulator coupled between the main external battery and the vout load terminal, when the voltage at the vout load terminal is less than the voltage of the main external battery, said low drop out voltage LDO regulator including a vreg output terminal;
    a charge pump circuit adapted to be connected in a feedback loop between said low drop out voltage LDO regulator and the vout load terminal, when the voltage at the vout load terminal exceeds the voltage of the main external battery; and
        wherein the charge pump circuit includes:
            an input terminal coupled to said vreg output terminal of the low drop out LDO voltage regulator; and
            an output terminal coupled to the vout output load terminal.

2. The voltage regulator of claim 1 wherein the low drop-out voltage regulator includes:
    an input terminal coupled to the main external battery;
    a reference voltage terminal adapted to be coupled to a voltage reference; and
    a feedback signal terminal for receiving a scaled vout signal.

3. The voltage regulator of claim 1, including a switch device for directly connecting said input and output terminals of said charge pump circuit when the charge pump is inactive.

4. The voltage regulator of claim 1, including a voltage divider circuit connected to the vout output terminal and providing a scaled output reference voltage signal to a feedback signal terminal of the low drop out LDO voltage regulator circuit.

5. The voltage regulator of claim 1, including a back-up battery coupled to the vout terminal to be charged by the voltage regulator circuit and to provide a backup voltage to the vout terminal.

6. A voltage regulator circuit, comprising:
a vbat input terminal adapted to be connected to an external main supply battery;
a vout output terminal adapted to be connected to a load circuit for the power converter and also adapted to be coupled to a back-up battery;
a low drop out LDO voltage regulator circuit having an input terminal coupled to said vbat input terminal, having a vreg output terminal, having a reference voltage terminal adapted to be coupled to a voltage reference, and a feedback signal terminal;
a charge pump circuit in feedback loop with said LDO voltage regulator, said charge pump circuit having an input terminal coupled to said output terminal of the low drop out LDO voltage regulator, said charge pump circuit having an output terminal coupled to the vout output terminal;
a switch device for directly connecting said input and output terminals of said charge pump circuit when the charge pump circuit is not used;
a voltage divider circuit connected to the vout output terminal and providing a scaled output reference voltage signal to the feedback signal terminal of the low drop out LDO voltage regulator circuit; and
a back-up battery coupled to the vout terminal to be charged by said voltage regulator circuit and to provide a backup voltage to the vout terminal.

7. The voltage regulator circuit of claim 6 including a tank capacitor connected to the vout output terminal.

8. The voltage regulator circuit of claim 6 including means for activating the charge pump circuit when the voltage at the vbat input terminal is less than the voltage at the vout output terminal.

9. The voltage regulator circuit of claim 6 including means for deactivating the charge pump circuit and for operating the switch device to directly connect said input and output terminals of said charge pump circuit when the voltage at the vout output terminal is less than the voltage at the vbat terminal.

10. The voltage regulator circuit of claim 6 wherein the switch device includes a MOS switch transistor.

11. The voltage regulator circuit of claim 6 wherein the low drop out LDO voltage regulator circuit includes an error amplifier having respective input terminals connected to the reference voltage terminal and to the feedback signal terminal, said error amplifier having an output terminal connected to a gate terminal of a MOS pass transistor having terminals connected respectively to the vbat terminal and to the vreg terminal.

12. The voltage regulator circuit of claim 6 wherein the charge pump circuit includes: a charge pump control circuit having an output terminal connected to one terminal of a fly capacitor, the other end of the fly capacitor connected to a charging node, a first MOS transistor connected between the input terminal of the charge pump circuit and the charging node, a second MOS transistor connected to between the charging node and the vout output terminal, clock circuit providing clock signals to gate terminals of the first and second MOS transistors.

13. The voltage regulator circuit of claim 6 wherein the back-up battery is a 3.0 volt Lithium-Ion battery.

14. The voltage regulator circuit of claim 6 wherein the vbat input terminal is adapted to be connected to an external main supply battery that is a Lithium-Ion battery having a terminal voltage ranging between 3 to 4.2 volts; and wherein only the low drop out LDO voltage regulator circuit is activated for such a Lithium-Ion battery.

15. The voltage regulator circuit of claim 6 wherein the vbat input terminal is adapted to be connected to an external main supply battery that is an Alkaline battery having a terminal voltage ranging between 1.8 to 3.0 volts; and wherein both the low drop out LDO voltage regulator circuit and the charge pump circuit in series with said LDO series voltage regulator are both activated for such an Alkaline battery.

16. The voltage regulator circuit of claim 15 wherein the charge pump circuit in series with said LDO voltage regulator is adapted to be activated with the Alkaline battery when the voltage at the vout output terminal exceeds the voltage at the vbat input terminal.

17. The voltage regulator circuit of claim 6 wherein the load circuit includes a low-current real time clock circuit that is powered by the voltage regulator circuit from the external main supply voltage or from the back-up battery in case of the external main supply battery not being available.

18. A method of providing a regulated vout voltage to a load circuit from a main battery comprising:
regulating a voltage from the main battery in a low drop out voltage regulator to an output terminal;
connecting a charge pump circuit in a feedback loop with the low drop out voltage regulator, when the main battery has a terminal voltage less than a desired output voltage, wherein connecting a charge pump includes directly connecting an input and an output of the charge pump circuit when the charge pump is inactive; and
connecting a back-up battery to the output terminal to supply a backup voltage to the load circuit when the voltage from the main battery is absent.

19. The method of claim 18, wherein regulating includes providing a scaled output reference voltage signal to a feedback signal terminal of the low drop out voltage regulator.

20. The method of claim 18, wherein connecting the back-up battery includes charging the back-up battery by the voltage regulator circuit and to provide a backup voltage to the output terminal.

21. The method of claim 20, wherein charging includes charging a 3.0 volt Lithium-Ion battery.

22. The method of claim 18, wherein connecting a charge pump circuit includes deactivating the charge pump circuit and operating a switch device to directly connect an input terminal and the output terminal of the charge pump circuit when the voltage at the output terminal is less than the voltage at an output terminal of the main battery.

23. The method of claim 22, wherein operating the switch device includes applying a signal to a gate of a MOS switch transistor.

24. The method of claim 18, wherein regulating voltage includes operating an error amplifier.

25. A voltage regulator for power provided from a main external battery having a vbat voltage to a vout load terminal for an external load, comprising:
a low drop-out-voltage (LDO) voltage regulator coupled between the main external battery and the vout load terminal, when the voltage at the vout load terminal is less than the voltage of the main external battery;
a charge pump circuit adapted to be connected in a feedback loop between said low drop out voltage LDO regulator and the vout load terminal, when the voltage at the vout load terminal exceeds the voltage of the main external battery; and a switch device for directly connecting said input and output terminals of said charge pump circuit when the charge pump is inactive.

26. The voltage regulator of claim 25, wherein the low drop-out voltage regulator includes:

an input terminal coupled to the main external battery;

a vreg output terminal;

a reference voltage terminal adapted to be coupled to a voltage reference; and a feedback signal terminal for receiving a scaled vout signal.

27. The voltage regulator of claim 26, including a voltage divider circuit connected to the vout output terminal and providing a scaled output reference voltage signal to a feedback signal terminal of the low drop out LDO voltage regulator circuit.

28. The voltage regulator of claim 27, including a back-up battery coupled to the vout terminal to be charged by the voltage regulator circuit and to provide a backup voltage to the vout terminal.

29. The voltage regulator circuit of claim 25, including a tank capacitor connected to the vout output terminal.

30. The voltage regulator circuit of claim 25, including means for activating the charge pump circuit when the voltage at the vbat input terminal is less than the voltage at the vout output terminal.

31. A method of providing a regulated vout voltage to a load circuit from a main battery comprising:

regulating a voltage from the main battery in a low drop out voltage regulator to an output terminal;

connecting a charge pump circuit in a feedback loop with the low drop out voltage regulator, when the main battery has a terminal voltage less than a desired output voltage;

connecting a back-up battery to the output terminal to supply a backup voltage to the load circuit when the voltage from the main battery is absent; and wherein connecting a charge pump circuit includes deactivating the charge pump circuit and operating a switch device to directly connect an input and the output of the charge pump circuit when the voltage at the output terminal is less than the voltage at an output terminal of the main battery.

32. The method of claim 31, wherein operating the switch device includes applying a signal to a gate of a MOS switch transistor.

33. The method of claim 31, wherein regulating voltage includes operating an error amplifier.

* * * * *

UNITED STATES PATENT AND TRADEMARK OFFICE
CERTIFICATE OF CORRECTION

| | | |
|---|---|---|
| PATENT NO. | : 7,550,954 B2 | Page 1 of 1 |
| APPLICATION NO. | : 11/464604 | |
| DATED | : June 23, 2009 | |
| INVENTOR(S) | : Fabrizio De Nisi et al. | |

It is certified that error appears in the above-identified patent and that said Letters Patent is hereby corrected as shown below:

On the Title page, in field (57), under "Abstract", in column 2, line 2, delete "or" and insert -- or a --, therefor.

Drawings On Sheet 3 of 3, in Figure 5, line 1, delete "LI-ON" and insert -- LI-ION --, therefor.

In column 1, line 54, delete "lower" and insert -- low --, therefor.

In column 1, line 56, delete "as" and insert -- as a --, therefor.

In column 2, line 25, delete "as" and insert -- as a --, therefor.

In column 3, line 52, delete "is" and insert -- is a --, therefor.

In column 5, line 11, delete "transmitter" and insert -- transistor --, therefor.

In column 5, line 46, delete "115" and insert -- 116 --, therefor.

In column 5, line 63, delete "vh" and insert -- a vh --, therefor.

In column 12, line 4, in Claim 14, delete "3to" and insert -- 3 to --, therefor.

In column 13, line 26, in Claim 29, delete "25," and insert -- 25 --, therefor.

In column 14, line 1, in Claim 30, delete "25," and insert -- 25 --, therefor.

Signed and Sealed this

Fourth Day of May, 2010

David J. Kappos
*Director of the United States Patent and Trademark Office*